March 20, 1945. J. M. HALDANE 2,372,081
FAUCET
Filed July 19, 1943
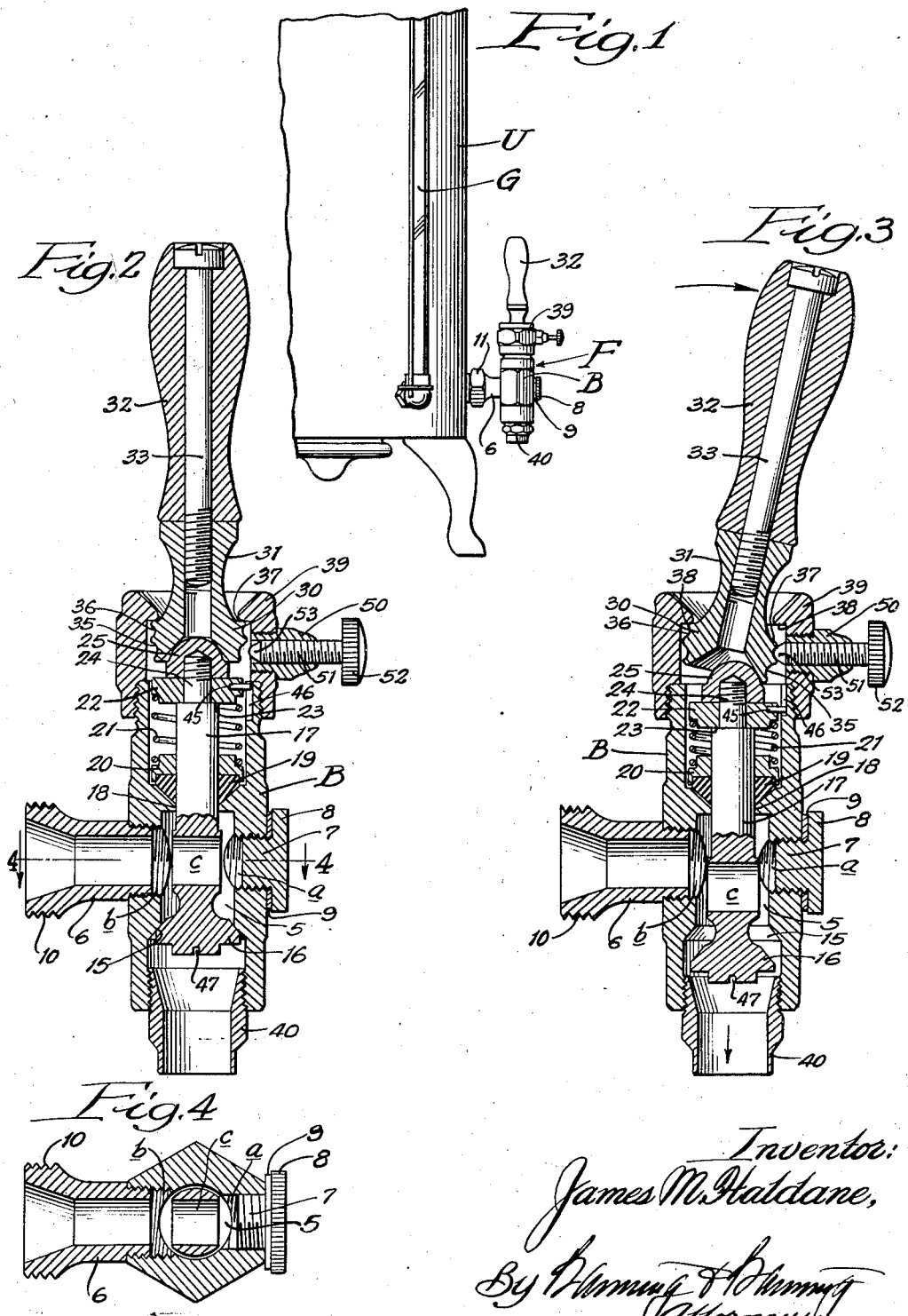

Patented Mar. 20, 1945

2,372,081

UNITED STATES PATENT OFFICE 2,372,081

FAUCET

James M. Haldane, Palos Heights, Ill., assignor to Harry W. Anderson, doing business as Brass Products Co., Chicago, Ill.

Application July 19, 1943, Serial No. 495,252

7 Claims. (Cl. 251—134)

My present invention relates to a faucet which is particularly suitable for use with a vessel from which liquid is to be drawn from time to time. In the example herein shown and described such a vessel is a coffee urn. The faucet when attached to such an urn presents an operating handle uppermost in position to be rocked in any direction for opening of the valve whereby to release coffee or other liquid for discharge through a nozzle outlet at the bottom.

The present improvements are directed largely to a construction of dispensing faucet in which accessibility by which to clean the faucet and passageway into the urn interior is facilitated; and in which the operating handle may be locked in either of two positions in one of which the faucet is held open. Features such as these render the faucet highly adaptable for the service suggested because it permits of easy cleansing of the faucet interior and passageway through to the urn interior which otherwise would tend frequently to become clogged and congested; and because, by locking the faucet open, draining of the urn may be facilitated, whenever required. Also, by locking the faucet closed, particularly during periods when coffee is in the making, an attendant is prevented from drawing some of the coffee before it is completed brewed. In addition to these advantages which are gained by the present construction, I utilize parts which are readily formed and assembled and which will operate dependably over a long period of service.

These as well as other objects of my invention may be realized from a construction of which a preferred embodiment is illustrated in the manner following:

Figure 1 is a fragmentary elevational view of a coffee urn equipped with the present faucet;

Fig. 2 is a central longitudinal section through the faucet with the valve in closed position;

Fig. 3 which is a similar view shows the valve in open position; and

Fig. 4 is a transverse sectional view taken on line 4—4 of Fig. 2.

The present faucet F is particularly advantageous when used with some such liquid supply source as an urn U (see Fig. 1) in which coffee may be made and from which it is to be drawn as needed. Such an urn is customarily equipped with a glass gauge G by which to observe the level of the coffee interiorly thereof.

The faucet here shown utilizes a body B in the form of a vertical barrel formed interiorly with a valve chamber 5 having through its opposite walls diametrically passages a and b interiorly threaded, one receiving a tubular nipple 6 and the other a plug 7 having an operating head 8. As by means of a gasket 9 against which the head is adapted to bear when the plug is advanced inwardly, a closure is provided whereby to prevent any leakage of liquid at that point. The nipple 6 which is tightly affixed to the barrel body is adapted also, as by a threaded head 10, to be affixed with the aid of a coupling 11 to a nipple which projects from a wall of the urn whereby to remain fixedly secured thereto.

The chamber 5 at its bottom is formed with an annular oblique seal 15 against which fits a valve member 16 in the general form of a cone head which is carried at the lower end of a reciprocable stem 17 which has bearing at 18 provided by a wall extending inwardly from the barrel body to define the upper limit of the chamber 5. The upper face of the bearing wall is inwardly tapered to receive a cone packing 19 overlaid by a cap 20 which receives thrust from one end of a compression spring 21 whose opposite end bears centrally against a thrust disk 22 that is seated upon a shoulder 23 provided near the upper end of the stem at a point from which an extension 24 rises to receive in its threaded end portion engagement from a cap nut 25. The bearing wall separates the valve chamber below from a second chamber thereabove in which are accommodated the spring, thrust disk, cap nut, and handle head 30 formed with a neck 31 supporting a body 32, there being an interconnecting bolt 33 extending axially between these parts. The handle head, which is formed with an axial socket conforming generally with the contour of the hemi-spherical end of the cap nut which is fitted therewithin, is provided with a pair of sunken contact points in the form of adjacent circular grooves 35 and 36, one above the other, the upper groove lying adjacent an annular shoulder 37 whose peripheral portion is engaged by an annular abutment here shown as an overlying flange 38 which extends inwardly from a collar 39 which is affixed, as by a screw threaded connection, to the upper end of the barrel body. The upper chamber is accordingly closed at the top by the handle head in association with the collar flange, the stem thrust disk lying close to the walls of this chamber so as to engage therewith, if need be, to receive therefrom support additional to that which is furnished by the bearing wall 18.

At the bottom end of the barrel body I may affix a nipple 40 affording an outlet opening in the form of a spout through which liquid is discharged when the valve is moved to open position counter to tension of the spring 21. Such a movement takes place whenever the handle is rocked from its position coaxial with the stem to one which is oblique thereto in any direction. In any such operation, the handle head at one peripheral point becomes a fulcrum exerting its force against the annular abutment thereabove, the result being that a downward thrust is exerted against the cap nut and the stem in connection therewith. This stem, as will be observed best in Fig. 4, is widened out in the valve chamber in the region opposite the two passages a and b where it is provided with a transverse opening c in register with the passages a and b when the valve is in closed position. To assure that the stem will remain in the correct rotative position for registration of its opening with the two passages a and b, a pin 45 is carried by the thrust disk 22, the pin being extended outwardly therefrom to lie in a slot 46 formed longitudinally of the barrel wall interiorly thereof with capacity for free sliding movement therein. Since this disk may be fixedly secured to the stem in a desired rotative position of adjustment by clamping action of the cap nut, it follows that provision is made for aligning the stem opening c with the passages a and b and for maintaining such alignment indefinitely. The valve member 16 may be formed on its under side with a slot 47 engageable as by a screw driver when inserted through the spout nipple whereby to produce rotation of the stem relative to the cap nut at its opposite end.

Through a wall of the collar 39 is a radial opening wherein is fitted a bushing 50 interiorly threaded to receive a screw 51 having an operating head 52 which lies exteriorly of the collar convenient for manipulation. The acting end 53 of this screw which may be cone-shaped lies opposite the lower circular groove 35 of the handle head when the handle and valve stem are axially aligned (see Fig. 2). When the valve is opened, however, consequent upon operation of the handle, the upper groove 36 at the point nearest the screw end 53 will be brought opposite thereto if the handle be rocked outwardly from the urn in the plane of the two sectional views, Figs. 2 and 3, which is toward and from the urn radially thereof. In this position the handle may be locked by advancing the screw (see Fig. 3) whereby to hold the valve open. In its opposite position (see Fig. 2) where the valve is closed the handle may also be similarly locked against movement to prevent accidental release of contents from the urn.

In operation, coffee may be brewed with the valve held closed until it is ready to be dispensed, after which the locking device may be released. Likewise, when the urn is to be drained for cleaning or other purposes, the valve may be held open by operation of the same device. When the valve chamber, or the nipple leading into the interior of the urn, requires cleaning, the plug 7 may be removed to permit a brush or wad to be inserted transversely through the valve chamber, through the valve stem therewithin, and through the nipple leading to the urn interior. When so inserted, the brush may easily be manipulated to dislodge and clean out any sediment or caked material making for congestion.

The features of particular advantage in the present faucet are (1) the facility with which its component parts may be assembled and disassembled, (2) the provision of conveniently accessible clean-out passages, (3) the valve operation in response to rocking of the handle in any direction, its movement being translated to a downward thrust through its ball and socket connection with the valve stem, and (4) the locking device acting through the operating handle to lock the valve either closed or open, as desired. For a faucet designed especially for use with a coffee urn these are particularly desirable features, as can readily be visualized. The general construction of the parts also follows standard practice so that dependability in operation over a long period of service may be counted upon.

I claim:

1. In a faucet of the type which includes a chambered body wherein is a valve comprising a reciprocable stem carrying a valve member movable toward and from a seat, and a spring normally urging the valve member against its seat, the combination of an operating handle in engagement with the stem end at a point interiorly of the valve body and rockable between first and second positions and urged by the spring acting through the stem to return to its normal first position in which the valve is closed, and a locking device movable into the valve body toward and from the operating handle adapted in one position only to engage therewith at a point interiorly of the valve body to hold the same in either of two positions in which the valve is maintained open and closed respectively.

2. In a faucet of the type which includes a chambered body wherein is a valve comprising a reciprocable stem carrying a valve member movable toward and from a seat, and a spring normally urging the valve member against its seat, the combination of a cap nut affixed to one end of the stem, a handle having a head with an axial socket for accommodation of the cap nut, a flange extended inwardly from the body overlying the head periphery and cooperating therewith to maintain the handle parallel with the stem in response to tension force exerted by the spring, the handle being rockable in any direction whereupon its topmost peripheral point becomes a fulcrum bearing against the under side of the flange to force the stem endwise counter to tension of the spring, and a locking device movable toward and from the handle head for engagement therewith at separated points when the handle is parallel with the stem and when inclined relative thereto whereby to secure the handle against movement in either of said two positions.

3. In a faucet of the type which includes a chambered body wherein is a valve comprising a reciprocable stem carrying a valve member movable toward and from a seat, and a spring normally urging the valve member against its seat, the combination of an operating handle having a head, a ball and socket connection between the stem and handle head, an annular abutment against which the handle head periphery is urged by the spring exerting its force through the stem, the handle when rocked in any direction being fulcrumed peripherally against the abutment to force the stem endwise counter to the force exerted by the spring whereby to move the valve member away from its seat, and a locking device movable between two positions in one of which it is adapted to engage the head of the operating handle to hold the same in a position wherein the valve member is maintained away from its seat.

4. In a faucet of the type which includes a chambered body wherein is a valve comprising a reciprocable stem carrying a valve member movable toward and from a seat, and a spring normally urging the valve member against its seat, the combination of a handle in operative connection with the valve stem at a point interiorly of the valve body and universally rockable to and from a first position and urged by the spring acting through the stem to return to its normal first position wherein the valve is closed, and a locking device movable into the valve body through a straight path toward and from the handle adapted in one position only to engage therewith at a point interiorly of the valve body to hold the same in a position wherein the valve member is maintained away from its seat.

5. In a faucet of the type which includes a chambered body wherein is a reciprocable valve movable to open and closed positions and a rockable handle movable between two positions in universal connection with the valve for operation thereof, the combination of a locking device movable toward and from the handle at a point substantially opposite its universal connection with the valve, the handle being provided with sunken contact points with each of which the locking device may successively engage first when the handle has been operated to a first position to open the valve and then when the handle has been operated to a second position to close the valve.

6. In a faucet having a chambered body wherein is a valve movable to open and closed positions, an operating handle, a ball and socket connection between the handle and valve, a locking device movable toward and from the handle at a point proximate to the ball and socket connection, and interengaging means on the locking device and handle affording a positive lock for the latter in either of two positions when the former is in advanced position.

7. A faucet having a body open at both ends and provided interiorly with a valve chamber whose opposite walls are traversed by registering passages, there being an annular valve seat between one body end and the registering passages, tubular means adapted to connect the valve body to a vessel and providing communication through one of the passages between the interiors of the body and vessel, a plug removably fitted in the other passage, a valve comprising a member movable lengthwise of the body toward and from the seat to close and open respectively a passage therethrough, a stem in connection with the member extending lengthwise of the body to a point about opposite the other body end, interengaging means between the body and stem for restraining rotative movement of the latter while permitting free longitudinal movement thereof, the stem being formed transversely with a through opening in register with the two passages when the valve member is positioned against the seat and affording, when the plug is removed, a clear passageway through the said tubular means, a handle having a head, a collar formed with an inturned flange engageable with the head adjacent its periphery to prevent movement of the head through the opening defined thereby, means connecting the collar to the body end adjacent the stem end, and interengaging means on the handle head and stem end for translating a rocking movement of the handle to a longitudinal movement of the stem in a direction to move the valve member away from its seat.

JAMES M. HALDANE.